(12) United States Patent
DeBolt

(10) Patent No.: US 7,682,573 B1
(45) Date of Patent: Mar. 23, 2010

(54) MICROSCOPE PLATE INDEX APPARATUS

(76) Inventor: Christopher Powell DeBolt, 2320 Cherrystone Dr., San Jose, CA (US) 95128

( * ) Notice: Subject to any disclaimer, the term of this patent is extended or adjusted under 35 U.S.C. 154(b) by 1720 days.

(21) Appl. No.: 10/776,542

(22) Filed: Feb. 10, 2004

(51) Int. Cl.
*G02B 21/24* (2006.01)
*G01N 21/01* (2006.01)

(52) U.S. Cl. .................. 422/104; 356/244; 359/391; 359/392; 359/393; 422/99

(58) Field of Classification Search ......... 359/391–394, 359/396, 397; 356/244; 422/99, 104
See application file for complete search history.

(56) References Cited

U.S. PATENT DOCUMENTS

| 4,836,667 | A | * | 6/1989 | Ozeki ..................... 359/389 |
| 5,344,179 | A | * | 9/1994 | Fritschi et al. .............. 280/618 |
| 2001/0043004 | A1 | * | 11/2001 | Casteel et al. ............ 297/344.13 |
| 2002/0141905 | A1 | | 10/2002 | Sha et al. |

OTHER PUBLICATIONS

Advertising sheet from DeBolt Machine & Fabrication showing SpeedView-1 model.

* cited by examiner

*Primary Examiner*—Jill Warden
*Assistant Examiner*—Paul S Hyun
(74) *Attorney, Agent, or Firm*—Thorpe North & Western LLP

(57) ABSTRACT

A microscope plate indexing apparatus includes a base platform and an indexing platform. The indexing platform has a slideway to slidingly receive a crystallography or other microscope plate. The indexing platform includes two projecting pins, one of which is a guide pin received in a guide groove in the base platform and the other of which is an indexing pin received in one of a plurality of indexing holes in the base platform. The indexing holes are preferably located in an indexing groove. The guide groove keeps the indexing platform aligned with the base platform during movement of the indexing pin from one indexing hole to the other and maintains the indexing platform in substantially fixed position in relation to the base platform when the indexing pin is in a selected indexing hole to insure correct alignment of the two platforms. The row of wells in the microscope plate is selected by selecting the indexing hole into which the index pin is inserted and the particular well of the row is selected by sliding the microscope plate in the slideway.

17 Claims, 4 Drawing Sheets

MICROSCOPE PLATE INDEX APPARATUS

BACKGROUND OF THE INVENTION

1. Field

Figure 1:
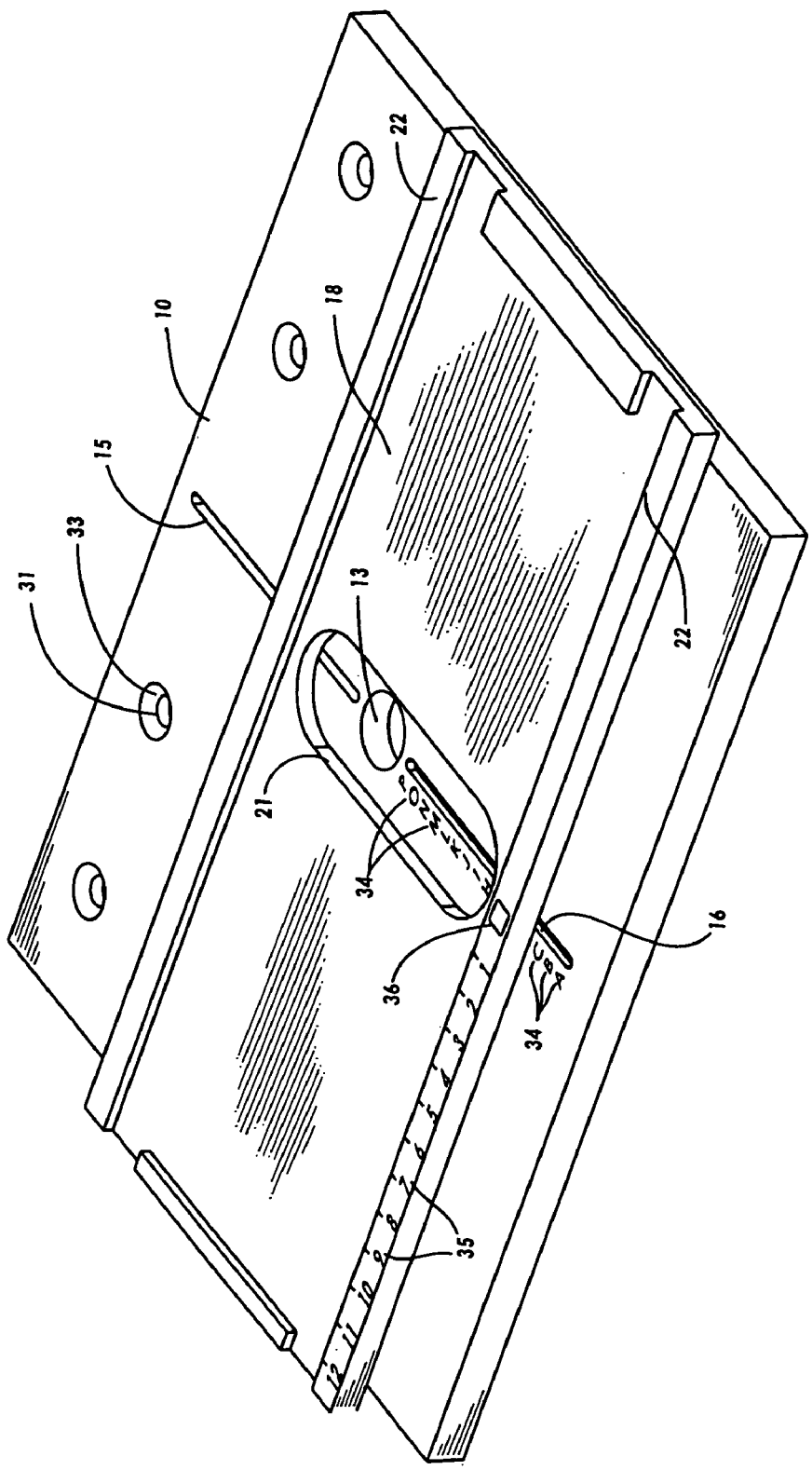

The invention is in the field of apparatus to aid in viewing plates with a plurality of separate sample locations with separate samples at a plurality of the sample locations to be individually aligned with a viewing field of a microscope so that each sample can be selectively and separately viewed under the microscope.

2. State of the Art

Various microscope plates are available which have a plurality of separate sample locations for separate samples at each of the separate sample locations to be separately view under a microscope. Each sample location with a sample must be individually aligned with a viewing field of the microscope used so that each sample can be selectively and separately viewed under (through) the microscope. Many of these plates are referred to as "microplates" and/or "crystallography plates" and are used in the biotechnology field for growing protein and other biological crystals. Such plates are available from Hampton Research, C. A. Greiner & Sohne Gesellschaft m.b.H., and Corning Incorporated. These plates have a plurality of sample wells therein with each well having a relatively small reservoir for receiving a protein solution and a reagent solution (the Greiner wells have three small reservoirs) and a relatively large reservoir for receiving a reagent solution that has a higher concentration than the reagent solution within the relatively small reservoir. The protein solution and reagent solution in the relatively small reservoir interact with the reagent solution in the relatively large reservoir via a vapor diffusion process which enables the formation of protein crystals within the relatively small reservoir. The relatively small reservoirs are then inspected, either by automated equipment or manually under a microscope, to determine the results of the process taking place in wells. The plates are generally of rectangular configuration with the wells arranged in a grid having a plurality of rows and columns. The number of wells in a plate vary, with each of the manufacturers mentioned above making plates with 96 wells, arranged in rows and columns, which are each individually examined when the plate is examined manually under a microscope. For such examination, the plate has to be moved in relation to the microscope so that each of small reservoirs of each of the 96 wells is moved into viewing position and viewed by the microscope. Examples of the identified plates are shown in U.S. Published Patent Application Pub. No. US 2002/0141905 A1.

A new plate available from Corning, the Corning CCP 384 NT Crystallization Plate, has 192 wells each having a relatively small reservoir and a relatively large reservoir. The wells are arranged in the plate in sixteen rows and twelve columns. The sixteen rows are identified by letters A through P and the columns are identified by numbers 1 through 12. Thus, there are 192 wells to be individually examined when the plate is examined under the microscope. The plate is the same overall size as the 96 well plate so the wells are smaller and closer together than are the 96 wells in the 96 well plates. There are twice as many rows of wells in the 192 well plate than in the 96 well plate. With the 192 well plate, the plate has to be moved in relation to the microscope so that each of the 192 wells is moved into viewing position and viewed by the microscope. With either plate, the viewing operation is time consuming when the plate is merely placed on the microscope base and the plate is move manually on the base to align the individual wells with the viewing path of the microscope.

An indexing apparatus for use with the 96 well Corning and Greiner plates has been manufactured by DeBolt Machine & Fabrication of San Jose, Calif. and available for several years under the trademark SPEEDVIEW from Hampton Research of Aliso Viejo, Calif. The Speedview apparatus has a base platform which is secured to the microscope base and an index platform that is adjustably secured to the base platform. The index platform has a slideway in which the plate is placed and along which it slides in one plane. The plate slides in the one plane to move from well to well along a single row of wells in the plate. The index platform is adjustably moved with respect to the base platform once the base platform is secured to the microscope base to select a particular row. A column of indexing holes on each side of a view through area (where the microscope views the sample in the plate through holes in the platforms of the indexing apparatus) of the indexing platform receives a pin extending from the base platform on each side of a view through area of the base platform to secure the index platform on the base platform in a selected position so that a row of wells can be viewed through the microscope by sliding the plate in the slideway. The pins are of one quarter inch diameter and the receiving holes are of mating diameter to provide proper movement of the indexing platform in relation to the base platform to move the indexing platform and slideway therein the proper distance to align adjacent rows of wells for microscope viewing. Further, the size of the pins and receiving holes ensure that the pins can only be placed in opposite holes of the columns to prevent the angling of the indexing platform on the base platform to ensure proper alignment of the rows of wells under the viewing area of the microscope. While the original Speedview apparatus works well for the 96 well plates, it does not work for the new 192 well Corning plate. The new 192 well plate has more rows that are closer together so requires smaller adjustment capabilities.

SUMMARY OF THE INVENTION

According to the invention, a microscope plate indexing apparatus which works well with the Corning 192 well crystallography plate, as well as with 96 well plates, includes a base platform and an indexing platform. The indexing platform has a slideway to slidingly receive the crystallography plate. The indexing platform includes two projecting pins, one of which is a guide pin received in a guide groove in the base platform and the other of which is an indexing pin received in one of a plurality of indexing holes in the base platform. The indexing holes are preferably located in an indexing groove. The guide groove keeps the indexing platform aligned with the base platform during movement of the indexing pin from one indexing hole to the other and maintains the indexing platform in substantially fixed position in relation to the base platform when the indexing pin is in an indexing hole to insure correct alignment of the two platforms. This allows smaller pins and indexing holes than in the original Speedview which allows closer adjustment steps.

THE DRAWINGS

Figure 2:
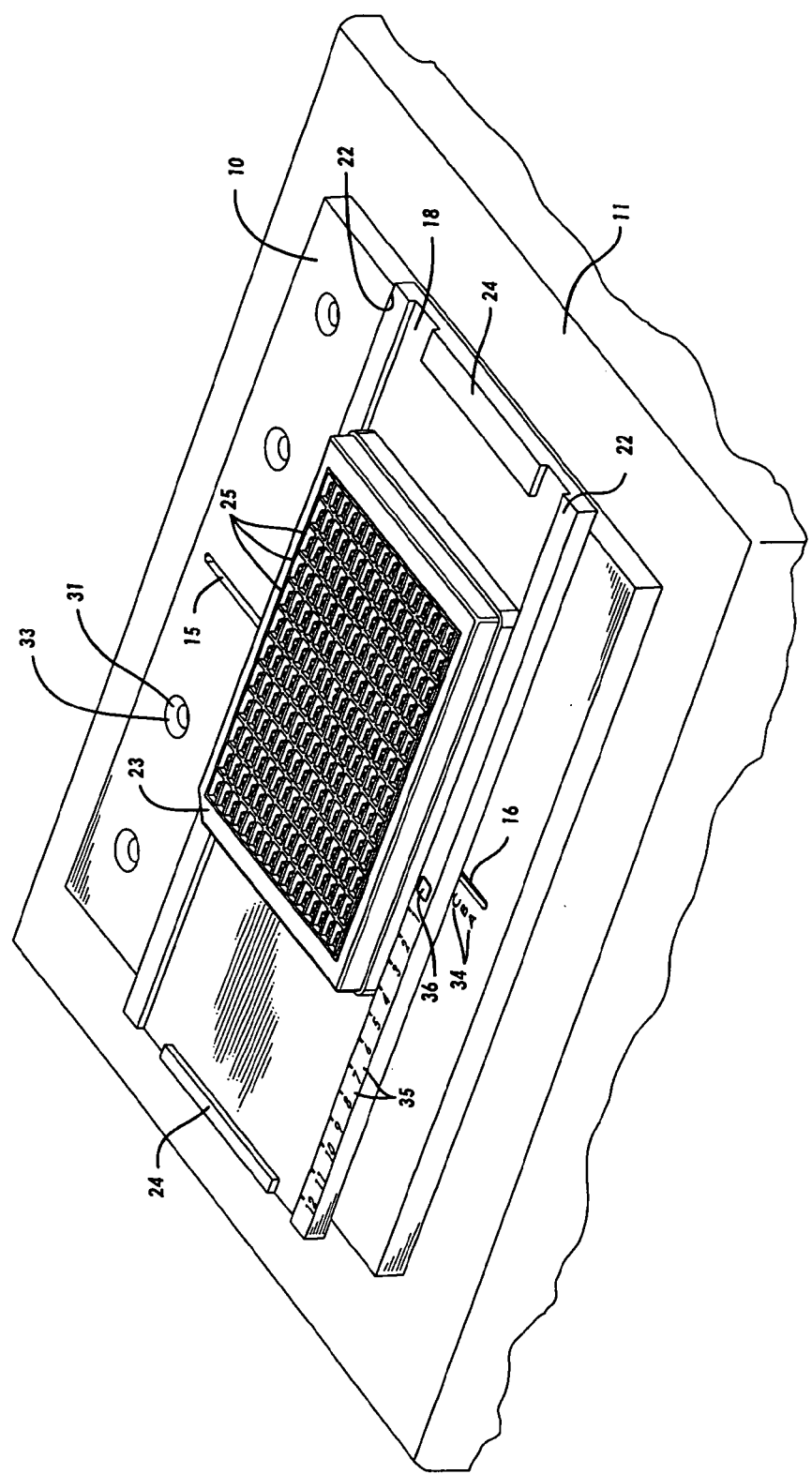
Figure 3:
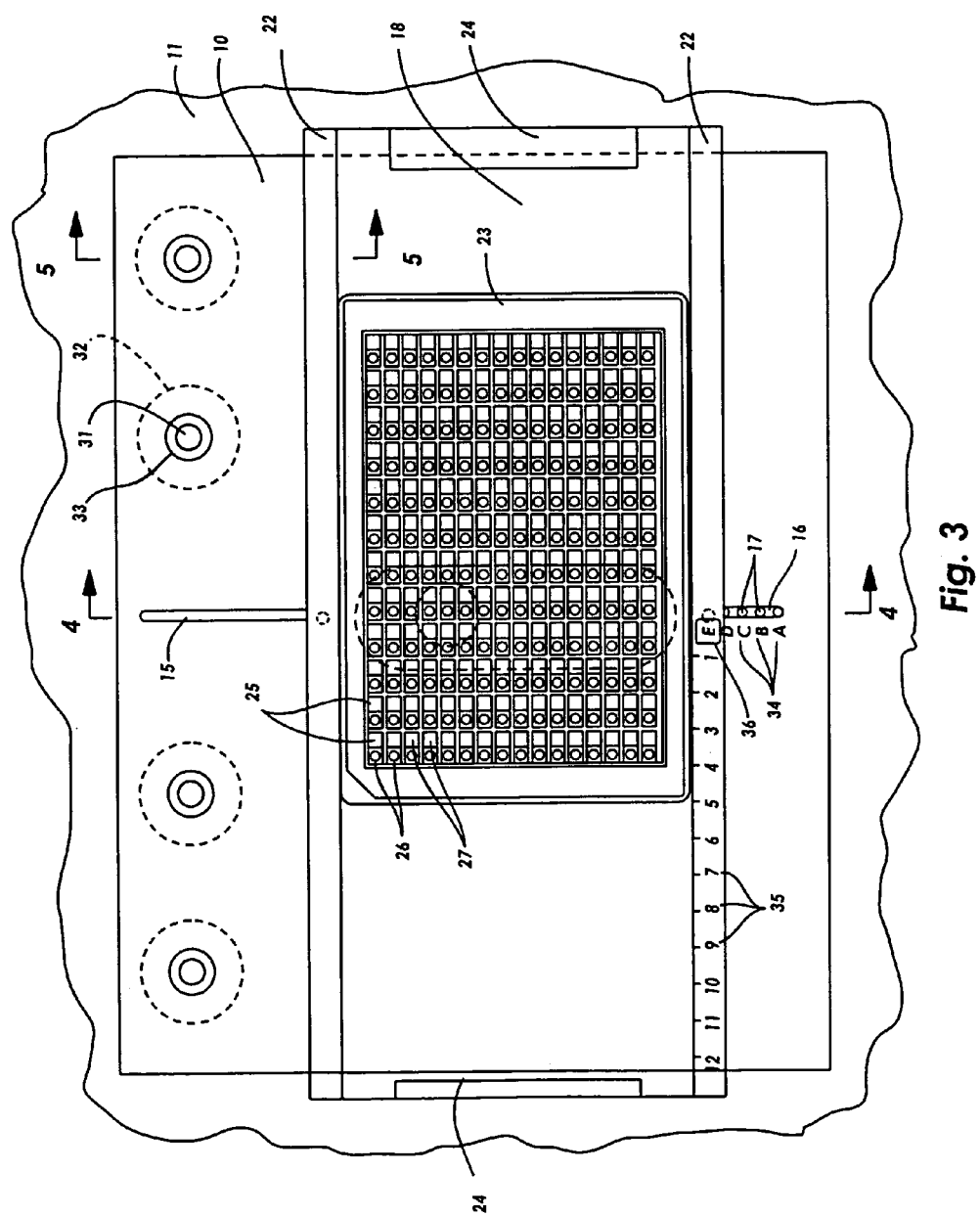
Figure 4:
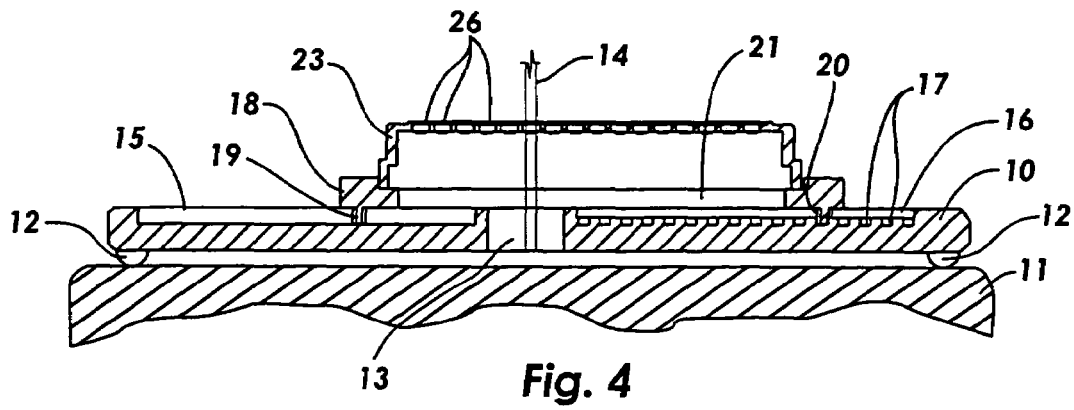
Figure 5:
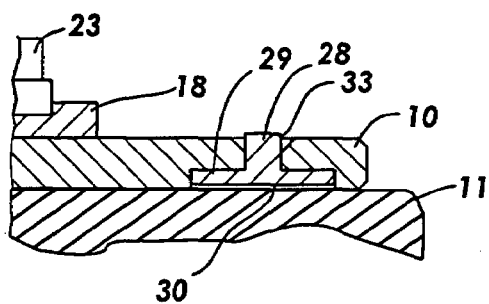
Figure 6:
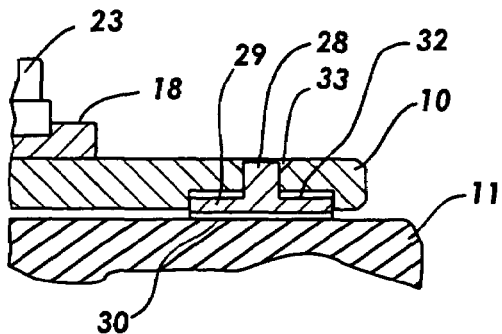

In the accompanying drawings, which show the best mode currently contemplated for carrying out the invention:

FIG. 1 is a perspective view of an apparatus of the invention showing the base platform and indexing platform;

FIG. 2, a perspective view of the apparatus of FIG. 1 in position on a microscope base with a microscope plate to be indexed in sliding position on the indexing platform;

FIG. 3, a top plan view of the apparatus of FIG. 2, showing the base platform, indexing platform, and a microscope plate, on the microscope base;

FIG. 4, a vertical section taken on the line 4-4 of FIG. 3;

FIG. 5, a fragmentary vertical section taken on the line 5-5 of FIG. 3 showing locating pins extending from the microscope base into receiving holes in the base platform; and FIG. 6, a fragmentary vertical section similar to that of FIG. 5, but showing the base platform raised slightly above the microscope base as it would be as the base platform is being placed onto the microscope base or is being removed from the microscope base.

DETAILED DESCRIPTION OF THE ILLUSTRATED EMBODIMENTS

The invention provides a quick and easy way to manually examine the individual wells of a microscope plate such as the Corning CCP 384 NT Crystallization plate which provides 192 wells available for protein crystallization and microscope observation. For microscope observation, each of the wells has to be moved, one-by-one, into the microscope observation field and examined. The apparatus of the invention allows a microscope plate to be placed in the apparatus, the apparatus adjusted to align a row of the plate with the microscope viewing field, and the plate to be slid in the apparatus from well to well in the selected row. Upon completion of viewing the wells in a row, the apparatus is adjusted to align a new, usually the next, row with the microscope viewing field for viewing the wells in that row. The procedure is repeated until all wells in all row have been examined.

The index apparatus of the invention includes a base platform 10 which is placed on a microscope base 11 and includes means, such as slip resistant feet 12, to maintain the base platform 10 in substantially fixed position on the microscope base 11. Any slip resistant material, such as a polyurethane material, may be used for slip resistant feet 12. Base platform 10 is positioned on microscope base 11 so that view through portion 13, here a hole through base platform 10, is positioned to encompass the microscope viewing field 14, FIG. 4, which is the field which the microscope sees. Thus, the base platform 10 does not block or interfere with the microscope viewing field 14. Base platform 10 includes a guide groove 15 and an index groove 16, FIGS. 1-4, with index holes 17 spaced along the bottom of index groove 16, FIG. 4.

An index platform 18 is positioned on base platform 10. A guide pin 19 extends from index platform 18 into index groove 16, FIG. 4, and index pin 20 extends from index platform 18 into index groove 16 and into a selected one of index holes 17. Guide pin 19 and index pin 20, when in a selected index hole 17, hold index platform 18 in fixed position with respect to base platform 10. With guide pin 19 in guide groove 15 and index pin 20 lifted from index holes 17 but still in index groove 16, index platform 18 can move in only one dimension as the respective pins slide along the respective grooves. Index platform 18 cannot rotate with respect to base platform 10. When index pin 20 reaches the selected index hole 17, index pin 20 is dropped down into the selected index hole. This locks the position of index platform 18 with respect to base platform 10. Index groove 16 is not necessary as it is the index pin 20 in an index hole 17 that secures the index platform 18 in fixed relation to base platform 10, so merely the index holes 17 are required, but index groove 16 provides a guide for index pin 20 to ease insertion into a selected index hole 17. Index platform 18 also includes a view through portion 21, here an elongate hole, which overlies view through portion 13 so that index platform 18 does not block or interfere with the microscope viewing field 14.

Index platform 18 has side rails 22 extending along its sides to form a slideway between the rails to slidingly receive a microscope plate 23, FIGS. 2, 3, and 4. Microscope plate 23 fits closely between the side rails 22 so microscopeR plate 23 is slidable in substantially only one dimension. Stops 24 may be formed at the respective ends of the slideway to limit sliding travel of microscope plate 23. Microscope plate 23 includes wells 25, FIG. 3, with each well having a relatively small reservoir 26 and a relatively large reservoir 27. Samples to be viewed through the microscope are placed or formed in the relatively small reservoirs 26 which are then selectively moved into microscope viewing field 14, FIG. 4, to be examined by a user through the microscope. The microscope viewing field 14 is generally slightly smaller in diameter than the relatively small reservoirs 26 placed in the microscope viewing field 14, so the microscope sees a magnified image of an area of the relatively small reservoir 26, here substantially all of the relatively small reservoir 26, located in the microscope viewing field 14. Microscope plate 23 may be slightly movable between side rails 22 so can be moved slightly by a user so the user can see substantially the entire relatively small reservoir 26.

Rather than, or in addition to, slip resistant feet 12, base platform 10 may be held in substantially fixed position on the microscope base 11, by locating post 28, FIGS. 5 and 6, with enlarged feet 29 having adhesive pads 30 secured to microscope base 11. Locating posts 28 fit into locating post receiving holes 31 with enlarged feet 29 fitting into enlarged diameter portions 32, FIG. 6, of locating post receiving holes 31. While slip resistant feet 12 are generally sufficient to maintain base platform 10 in substantially fixed position on microscope base 11, locating posts 28 ensure a substantially fixed position. With locating posts 28 adhered to microscope base 11, base platform 10 can be easily placed in position over such posts by placing locating post receiving hole 31 over locating post 28 and pushing base platform 10 down over the locating posts. Base platform 10 may be easily removed by pressing the top of locating posts 28 through upper tapered portions 33 of locating post receiving holes 31.

Locating post receiving holes 31 in base platform 10 are preferably sized to snugly hold locating posts 28 therein. In such case, locating posts 28 may be initially installed on microscope base 11 by pushing locating posts 28 into locating post receiving holes 31, where they will be retained in position as shown in FIG. 5. The adhesive on adhesive pads 30 is exposed. Base platform 10 is then located in the desired position on microscope base 11 and locating posts 28 are pressed downwardly by a user against microscope base 11 to adhere them to the microscope base. Base platform 10 can then be removed and replaced in the same position using locating posts 28 and locating post receiving holes 31.

In use, a user places base platform 10 in desired position on microscope base 11. This desired position usually will be with the A 1 well, which can be marked around the edges with a black pen so can be identified through the microscope, initially in the microscope viewing field 14. The base platform 10 is squared on the microscope base 11 and, with slip resistant feet 12 usually will remain in position during use of the apparatus. The microscope plate 23 is slid in the slideway of the index platform 18 so that all wells in a row are examined, and the index platform 18 is then adjusted to the next row. Each well in that row is examined and the index platform 18 is adjusted again to the next row. This continues until all wells in the microscope plate 23 are examined. The apparatus can be left on microscope base 11 while microscope plate 23 is replaced in the slideway in index platform 18 with another microscope plate 23 to be examined. Alternately, as described, when the base platform 10 is in desired position, locating posts 28 can be adhered to microscope base 11 to hold the base platform 10 in fixed position as the index platform 18 is adjusted and microscope plates 23 are placed and removed and viewed.

It is preferred that the index holes 17 be identified by letters 34 engraved or otherwise marked on base platform 10 adjacent index holes 17 and index groove 16 as shown in FIGS. 1 and 3, and that numbers 35 be engraved or otherwise marked as shown along a side rail 22 of index platform 18. This provides an indication to the user of the particular well being observed. The row of the well being observed, if the base platform 10 is correctly positioned as indicated above, will be indicated by the particular letter of the column of letters 34 showing in indicator box 36. The column of the well is indicated by the position of the microscope plate 23 in relation to the numbers 35 on index platform 18, as microscope plate 23 is slid along the slideway in index platform 18. The left edge of the microscope plate 23 lines up with a number 35 to indicate the row. Thus, in FIGS. 2 and 3, the alignment of the left edge of microscope plate 23 with the number five in the numbers 35 indicates that row five of the wells 25 is in the microscope viewing field 14.

The apparatus can be made of various materials and in various sizes. For use with the Corning plates described, a base platform nine inches by seven inches made of three eighths inch acrylic and an index platform nine and one half inches by four inches made of one quarter inch acrylic has been found satisfactory. Pins of 0.093 inch diameter have also been found satisfactory.

While the plate shown is a 192 well plate and the letters 34 are specifically adapted for the 192 well plate, a 96 well plate of the same overall size could be indexed with the apparatus shown using every other index hole to move between rows. With such movement the letters 34 will be incorrect. Of course, the apparatus can be modified specifically for use with any type or size of microscope plate 23 with any number of wells.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. Apparatus for indexing a microscope plate to selectively position a portion of the microscope plate in a viewing field of the microscope to be observed through the microscope, comprising:
    a base platform adapted to be placed on a microscope base and having a view through portion positioned in the viewing field of the microscope;
    an indexing platform adapted to have the microscope plate placed slidingly thereon and having a view through portion overlying the view through portion of the base platform;
    side rails along the indexing platform defining a microscope plate slideway to limit sliding movement of the microscope plate on the indexing platform to movement in substantially a single dimension, whereby portions of the microscope plate can be selectively positioned over the view through portions of the indexing platform and the base platform to place such selected portion of the microscope plate in the microscope viewing field;
    a guide pin extending from the indexing platform;
    a guide groove in the base platform to receive the guide pin when the indexing platform is in position on the base platform;
    an indexing pin extending from the indexing platform;
    a plurality of indexing holes in the base platform to receive the indexing pin in a selected indexing hole when the indexing platform is in position on the base platform; and
    means for maintaining the base platform in substantially fixed position on the microscope base when placed in desired position thereon.

2. Apparatus for indexing a microscope plate according to claim 1, additionally including an indexing groove in the base platform from which the indexing holes extend.

3. Apparatus for indexing a microscope plate according to claim 2, wherein the indexing pin extends from the indexing platform, through the indexing groove, and into a selected indexing hole when the indexing platform is positioned on the base platform.

4. Apparatus for indexing a microscope plate according to claim 3, wherein the means for maintaining the base platform in substantially fixed position on the microscope base are slip resistant feet supporting the base platform on the microscope base.

5. Apparatus for indexing a microscope plate according to claim 4, wherein the slip resistant feet are polyurethane feet.

6. Apparatus for indexing a microscope plate according to claim 3, wherein the means for maintaining the base platform in substantially fixed position on the microscope base is a plurality of locating pin receiving holes adapted to receive locating pins extending from the microscope base.

7. Apparatus for indexing a microscope plate according to claim 3, wherein the microscope plate to be indexed includes a plurality of rows of wells to be observed through the microscope, and each indexing hole is adapted to align a row of the microscope plate with the viewing field of the microscope.

8. Apparatus for indexing a microscope plate according to claim 7, wherein each row of the microscope plate includes a plurality of wells, and the microscope plate slideway defined on the indexing platform is adapted to allow sliding of the microscope plate to align a selected well of the selected row of wells in the viewing field of the microscope when placed in the microscope plate slideway.

9. Apparatus for indexing a microscope plate according to claim 8, additionally including stops on the indexing platform to limit sliding travel of the microscope plate on the indexing platform.

10. Apparatus for indexing a microscope plate according to claim 2, wherein the guide groove and the indexing groove are aligned on opposite sides of the view through portion of the base platform.

11. Apparatus for indexing a microscope plate according to claim 2, additionally including labels adjacent each indexing hole along a side of the indexing groove.

12. Apparatus for indexing a microscope plate according to claim 1, wherein the microscope plate to be indexed includes a plurality of rows of wells to be observed through the microscope, and each indexing hole is adapted to align a row of the microscope plate with the viewing field of the microscope.

13. Apparatus for indexing a microscope plate according to claim 12, wherein each row of the microscope plate includes a plurality of wells, and the microscope plate slideway defined on the indexing platform is adapted to allow sliding of the microscope plate to align a selected well of the selected row of wells in the viewing field of the microscope when placed in the microscope plate slideway.

14. Apparatus for indexing a microscope plate according to claim 3, additionally including stops on the indexing platform to limit sliding travel of the microscope plate on the indexing platform.

15. Apparatus for indexing a microscope plate according to claim 1, wherein the means for maintaining the base platform in substantially fixed position on the microscope base are slip resistant feet supporting the base platform on the microscope base.

16. Apparatus for indexing a microscope plate according to claim 15, wherein the slip resistant feet are polyurethane feet.

17. Apparatus for indexing a microscope plate according to claim 1, wherein the means for maintaining the base platform in substantially fixed position on the microscope base is a plurality of locating pin receiving holes adapted to receive locating pins extending from the microscope base.

* * * * *